United States Patent
Leutgeb et al.

(10) Patent No.: US 7,971,794 B2
(45) Date of Patent: Jul. 5, 2011

(54) ACTIVELY REGULATED MODULATION INDEX FOR CONTACTLESS IC DEVICES

(75) Inventors: Thomas Leutgeb, Lieboch (AT); Walter Kargl, Graz (AT); Richard Sbuell, Graz (AT); Edin Ibrahimagic, Graz (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 172 days.

(21) Appl. No.: 12/027,856

(22) Filed: Feb. 7, 2008

(65) Prior Publication Data
US 2009/0200383 A1 Aug. 13, 2009

(51) Int. Cl.
*G06K 19/06* (2006.01)
*G06K 7/08* (2006.01)
*G06K 19/00* (2006.01)

(52) U.S. Cl. .......................... 235/492; 235/451; 235/487

(58) Field of Classification Search .................. 235/380, 235/441, 451, 487, 492; 340/531, 870.3; 329/300, 304, 315; 375/220
See application file for complete search history.

(56) References Cited

U.S. PATENT DOCUMENTS

| | | | |
|---|---|---|---|
| 5,847,662 A * | 12/1998 | Yokota et al. | 340/10.34 |
| 6,134,130 A * | 10/2000 | Connell et al. | 363/89 |
| 6,307,428 B1 | 10/2001 | Nebel et al. | |
| 6,343,022 B1 * | 1/2002 | Naruse | 363/16 |
| 6,427,065 B1 * | 7/2002 | Suga et al. | 455/41.1 |
| 6,565,001 B1 * | 5/2003 | Schoenbauer | 235/451 |
| 6,624,743 B1 * | 9/2003 | Ikefuji et al. | 340/10.4 |
| 6,907,088 B1 | 6/2005 | Nakane et al. | |
| 6,954,053 B2 | 10/2005 | Gay | |
| 6,963,269 B2 * | 11/2005 | Saitoh et al. | 340/10.1 |
| 7,141,939 B2 * | 11/2006 | Nagasawa et al. | 315/291 |
| 7,218,204 B2 * | 5/2007 | Hayashi | 340/10.34 |
| 7,506,820 B2 * | 3/2009 | Allard et al. | 235/492 |
| 2003/0128070 A1 | 7/2003 | Rizzo et al. | |
| 2005/0040885 A1 | 2/2005 | Hayashi | |
| 2005/0056704 A1 * | 3/2005 | Kim | 235/492 |
| 2007/0069860 A1 * | 3/2007 | Akiyama et al. | 340/10.1 |
| 2007/0075143 A1 * | 4/2007 | Higashi | 235/451 |
| 2007/0164122 A1 | 7/2007 | Ju | |
| 2008/0224766 A1 | 9/2008 | Yamazaki et al. | |
| 2008/0265987 A1 | 10/2008 | Yamazaki | |
| 2008/0298481 A1 * | 12/2008 | Rofougaran et al. | 375/260 |
| 2009/0046809 A1 * | 2/2009 | Meltzer | 375/308 |

FOREIGN PATENT DOCUMENTS

| | | |
|---|---|---|
| EP | 1089217 A1 | 4/2001 |
| WO | WO-00/28708 A1 | 5/2000 |
| WO | WO-2007/063584 A1 | 6/2007 |
| WO | WO-2007/063589 A1 | 6/2007 |

* cited by examiner

*Primary Examiner* — Thien M. Le
*Assistant Examiner* — April A Taylor
(74) *Attorney, Agent, or Firm* — Dickstein Shapiro LLP

(57) ABSTRACT

A contactless IC device including a detection circuit configured to detect a carrier wave that has been amplitude shift-keying (ASK) modulated with digital data and a shunt circuit configured to regulate the carrier wave to a predetermined voltage level.

21 Claims, 2 Drawing Sheets

ACTIVELY REGULATED MODULATION INDEX FOR CONTACTLESS IC DEVICES

FIELD OF THE INVENTION

The present invention relates to regulating the modulation index of ASK modulated carrier waves at the input of a contactless IC device.

BACKGROUND OF THE INVENTION

Contactless IC (integrated circuit) devices, also known as chip cards or smart cards, operate on the basis of communication by an electromagnetic field with a read and/or write interrogating device, generically referred to as a reader.

In contactless IC device applications, the reader typically transmits an electromagnetic carrier wave having a carrier frequency of 13.56 MHz. This transmitted carrier wave serves on the one hand to power the contactless device, which thus derives by induction the energy required for its operation, and on the other hand to set up a communication between the device and the reader according to an established communication protocol. Thus, when the contactless device penetrates into the transmission field of the reader, it communicates with the latter by a modulation operation which consists of modifying at least one parameter of the carrier. The modulation index for ASK modulation carrier waves typically ranges anywhere from between 7-30%. The wide range of acceptable modulation indices has caused compatibility issues with conventional demodulator circuits and thereby increased demodulator requirements resulting in increasingly complex demodulators.

SUMMARY OF THE INVENTION

A contactless IC device including a detection circuit configured to detect a carrier wave that has been amplitude shift-keying (ASK) modulated with digital data and a shunt circuit configured to regulate the carrier wave to a predetermined voltage.

These and further features and advantages of the present invention will become more apparent from the following description when taken in connection with the accompanying drawings which show, for purposes of illustration only, an embodiment in accordance with the present invention.

BRIEF DESCRIPTION OF THE DRAWINGS

The same or corresponding components in the following drawings are denoted by the same reference numerals.

DETAILED DESCRIPTION OF PREFERRED EMBODIMENTS OF THE INVENTION

Figure 1:
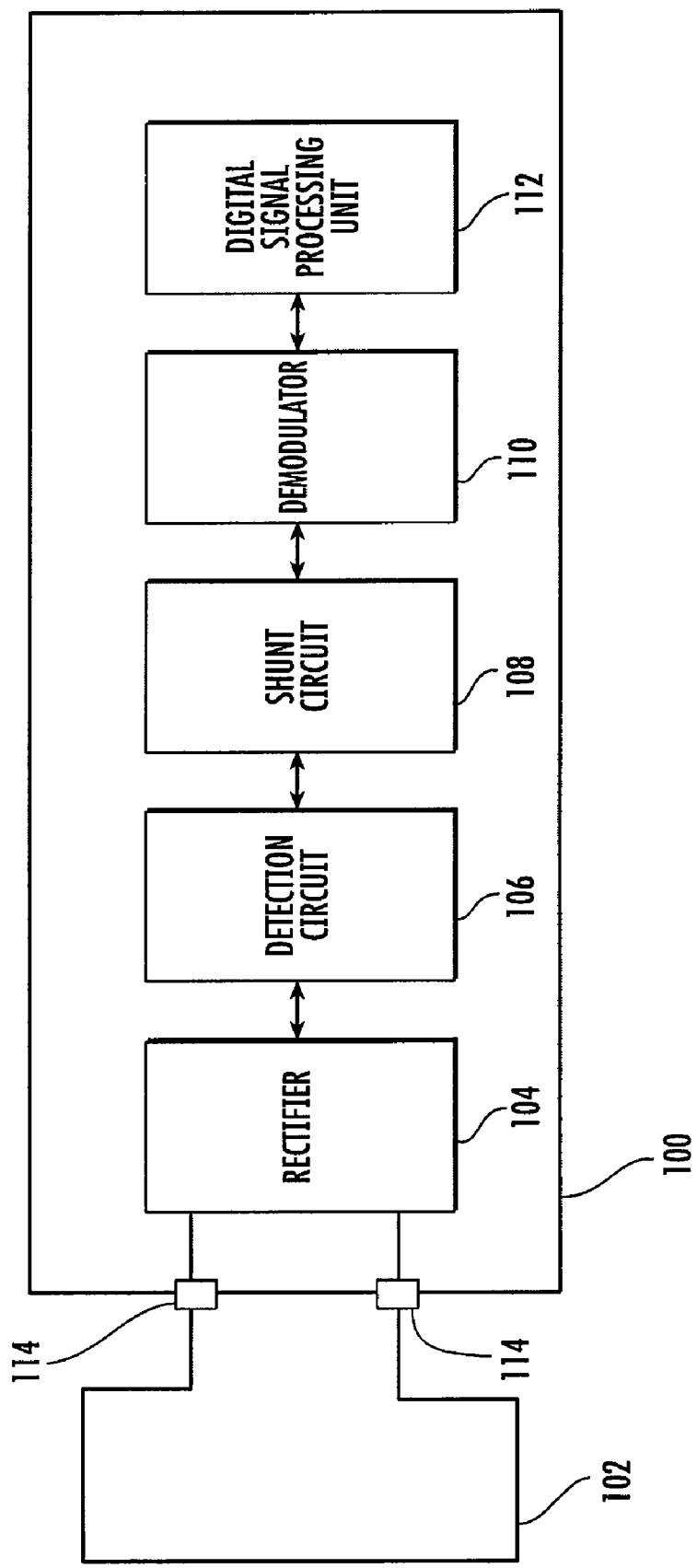
FIG. 1 is a diagram illustrating an exemplary structure of a contactless IC device in accordance with an embodiment of the present invention.

A contactless IC device according to an embodiment of the present invention will be described with reference to FIG. 1. FIG. 1 is a block diagram showing a construction of a contactless IC device 100 configured to actively regulate a modulation index at coil contacts 114 between two stable values (e.g., V1 and V2), independent of the applied modulation index of an ASK modulation.

Contactless IC device 100 includes a coil antenna 102 for receiving electromagnetic wave energy that is transmitted from an external device. Coil antenna 102 serves as an antenna for transmitting/receiving carrier waves, which have been ASK modulated with data, to and from the contactless IC device 100. Carrier waves received by coil antenna 102 are rectified by rectifier 104 to generate a power supply voltage.

Rectifier 104 is connected to the coil antenna 102 and serves to convert the carrier wave into a DC power supply voltage. Rectifier 104 is a full-wave rectification circuit and can be implemented in any fashion known in the art so long as it converts an AC signal into a DC signal. In accordance with an alternative arrangement of the present invention, a half-wave rectification circuit is employed.

A detection circuit 106 is connected to rectifier 104. Detection circuit 106 is operable to identify ASK modulation at the beginning of the falling slope of an ASK modulated carrier wave. For this purpose, detection circuit 106 preferably comprises a demodulator operable to detect the rising and falling edges of the modulated carrier wave. Detection circuit 106 is a dynamic circuit that evaluates the modulated carrier wave to detect in real time the rising and falling edges of the modulated carrier wave. This detection begins on the falling slope of the carrier wave envelope and, in response, shunt circuit 108 regulates the ASK modulation from an initial or first voltage level V1 to a desired and predetermined voltage V2 (FIG. 2B). When the next rising edge is detected by the detection circuit 106 (signifying the end of the ASK modulation) the circuit regulates actively back to the initial voltage V1.

Shunt circuit 108 is responsible for ensuring that the modulation index of the ASK modulation is actively regulated between a first voltage level (V1) and a predetermined voltage level (V2) at the coil contacts 114. Voltage levels V1 and V2 are two unequal, stable voltages. Accordingly, demodulator 110 always "sees" a constant modulation index independent from the modulation index applied from the field. Notably, for very deep modulations with modulation indices of, for example, 30% this arrangement also prevents the contactless IC from too less voltage and guarantees operation without energy loss. Demodulator 110 is any electronic circuit capable of recovering information content from the carrier wave of a signal, and preferably, is a voltage or current demodulator.

In accordance with the present invention the detection circuit 106 is operable to detect ASK modulation at any point on the falling slope of the ASK modulated carrier wave, and in response to the detection the shunt circuit 108 regulates the ASK modulation from the first voltage V1 to the predetermined voltage level V2. The detection circuit 106 detects an end of ASK modulation at any point on the rising edge of the ASK modulated carrier wave and upon detecting an end, the shunt circuit 108 regulates actively back from the predetermined voltage level V2 to the first voltage V1. The importance of the detection circuit 106 is that the predetermined voltage does not depend on the modulation index of the ASK modulated carrier wave.

Shunt circuit 108, connected between the detection circuit 106 and the demodulator 110, also protects the circuits inside contactless IC device 100 from getting damaged by over-voltage, in cases such as where the distance between the contactless IC 100 and the reader/writer becomes too small. It does this by preventing the power supply voltage from increasing above a breakdown voltage. For example, when the power supply voltage is increased above 4V, the shunt circuit 106 consumes excess energy and, as a result, the increase of the power supply voltage can be reduced.

Shunt circuit 108 is connected to a demodulator 110. Demodulator 110 demodulates the carrier wave received by contactless IC device 100 to recover data piggybacked thereon, according to a demodulation method that corresponds to the modulation method employed in the reader/writer. Demodulator 110 is configured to receive the regulated carrier wave and demodulate the carrier wave to extract the digital data according to a demodulation method that corresponds to a modulation method employed in an external device.

The received data is transferred to digital signal processing unit 112. Digital signal processing unit 112 can be constituted by a CPU and can include or communicate with a memory (not shown). Digital signal processing unit 112 then performs a predetermined process on the recovered digital data. Once the digital data has been processed by digital signal processing unit 112, the contactless IC 100 can transmit a response signal back to the reader/writer. Since the present invention is concerned with actively regulating the modulation index of ASK modulated carrier waves received from a reader, for purposes of this disclosure the transmission of a response signal to the reader has been omitted.

Referring to FIGS. 1 and 2, contactless IC's 100 regulation of the modulation index at the coil contacts is described below beginning with reception of an ASK modulated carrier wave by device 100.

An external reader/writer (not shown) performs ASK modulation on a carrier wave of a predetermined frequency (e.g. 13.56 MHz in accordance with ISO 14443 Type B) using data to be transmitted, and transmits the ASK modulated carrier wave to the contactless IC device 100. ASK modulation employed for data transfer from a reader/writer to the contactless IC 100 defines digital data in accordance with the level of the amplitude of the carrier wave. The use of ASK modulation having a modulation index of less than 100% enables high speed transfer with a narrow occupied bandwidth, and therefore allows a contactless IC device to obtain a proper demodulated carrier wave.

Once the coil antenna 102 receives the ASK modulated carrier wave from the reader/writer, the rectifier 104 rectifies the carrier wave to generate a power supply voltage. Detection circuit 106 then identifies ASK modulation at the beginning of the falling slope of an ASK modulated carrier wave. This identification is made at the input of the contactless IC device 100. As soon as the modulation is detected shunt circuit 108 regulates the ASK modulation to a predetermined voltage V2. At the next rising edge, when the end of ASK modulation is detected, the circuit regulates actively back to an initial or first voltage V1, thus creating a regulated carrier wave. Next, this regulated carrier wave passes to demodulator 110 where the piggybacked data is extracted from the carrier. However, since the carrier wave has been regulated as it passed through the detection and shunt circuits, 106 and 108, demodulator 110 always sees a constant modulation index independent from the modulation index applied from the field. This is of importance because a wide range of modulation indices for ASK modulated carrier waves can be applied from the field without increasing complexity or otherwise redesigning, adjusting or reconfiguring the demodulator of contactless IC device 100. Especially for very deep modulations (e.g., modulation of approximately index 30%) this mechanism also prevents the circuit from too less voltage and guarantees operation without energy loss.

Figure 2A:
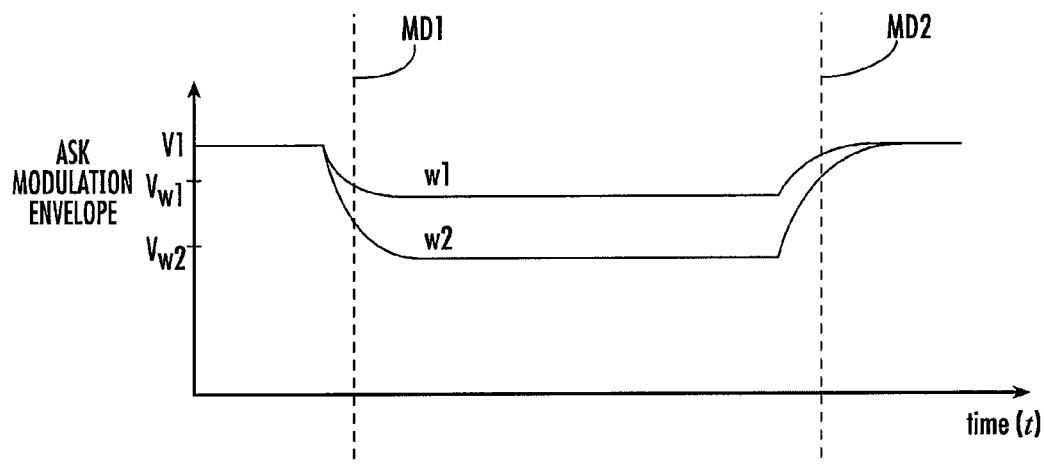
FIG. 2A is a timing chart showing two different envelopes of an ASK modulation.
Figure 2B:
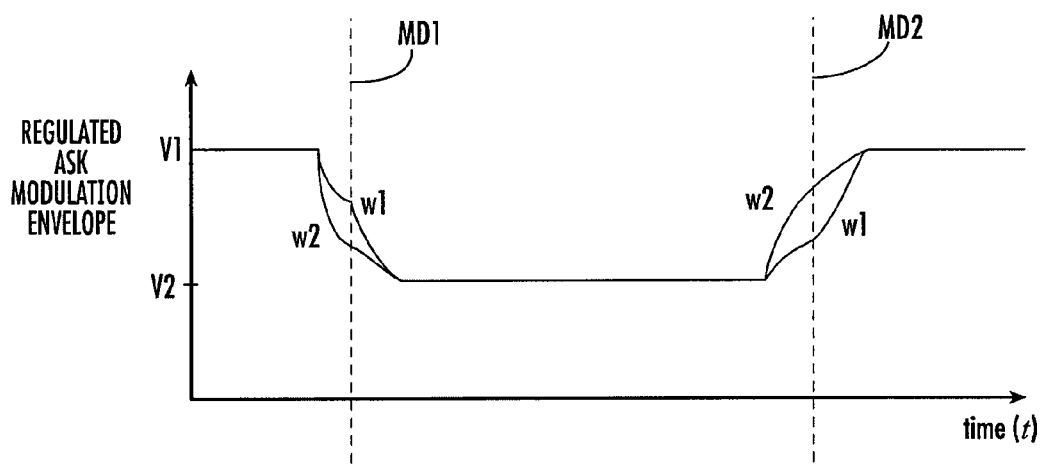
FIG. 2B is a timing chart showing two different envelopes of an ASK modulation that have been regulated to a stabilized voltage level V2 in accordance with an embodiment of the present invention.

FIG. 2A shows the envelope of an ASK modulation in the field with two different modulation indices, W1, with a modulation index of approximately 7%, and W2, with a higher modulation index of approximately 30%. As shown, the carrier wave with the modulation index W1 falls to a voltage $V_{W1}$ and the carrier wave with the modulation index W2 falls to a voltage $V_{W2}$. Accordingly, voltage $V_{W1}$ and $V_{W2}$ are dependant on their respective modulation indices W1 and W2. Lines MD1 and MD2 are used to define points on the falling and rising edges, respectfully, of the ASK modulation envelopes and will be discussed in further detail below with reference to FIG. 2B.

FIG. 2B is an illustration showing how the input structure of a contactless IC 100 in accordance with an embodiment of the present invention actively regulates the modulation index at the coil contacts between two stable values (e.g., V1 and V2), independent of the applied modulation index of the ASK modulation. Referring to FIG. 2B, contactless IC 100 regulates to V1 when no modulation is detected. As soon as a modulation is detected by detector circuit 106 (line MD 1) the IC 100 regulates to the voltage level V2. Accordingly, for both modulation indices (W1 and W2) the voltage stays constant (V2) on the chip contacts. Further, when ASK modulations in the field has multiple modulations such as W1 and W2, the resonant current measured with a close coupled field coil will be the same for each modulation index.

The present invention has been described with reference to the communication standard is ISO14443 TYPE B. ISO 14443 is an international standard which describes how contactless devices and terminals should work to ensure industry-wide compatibility, for example in identity, security, payment, mass-transit and access control applications. One reason for adopting the ISO 14443 standard is it provides increased security. Because the standard provides for faster data transmission, more information can be stored on the microchip and transmitted to the reader.

ISO 14443 consists of four parts and describes two types of devices: type A and type B. The main differences between these types concern modulation methods, coding schemes (part 2) and protocol initialization procedures (part 3).

Those of skill in the art will appreciate that the present invention is not so limited and the application of other communication standards are within the scope of the embodiments described herein. Additionally, one skilled in the art will appreciate that additional variations may be made in the above-described embodiment of the present invention without departing from the spirit and scope of the invention which is defined by the claims which follow.

The invention claimed is:

1. A contactless IC device comprising:
   a detection circuit configured to detect that a carrier wave has been amplitude shift-keying (ASK) modulated with digital data; and
   a shunt circuit configured to receive the detected ASK modulated carrier wave and to regulate the ASK modulated carrier wave between a first voltage and a predetermined voltage, the first voltage and the predetermined voltage not being equal,
   wherein the shunt circuit is configured to regulate the carrier wave to the predetermined voltage in response to the detection circuit detecting ASK modulation at any point along a falling slope of the ASK modulated carrier wave.

2. The contactless IC device of claim 1, wherein the detection circuit comprises a demodulator operable to detect rising and falling edges of the ASK modulated carrier wave.

3. The contactless IC device as in claim 2, wherein the demodulator demodulates the carrier wave according to a demodulation method that corresponds to a modulation method employed in an external device.

4. The contactless IC device of claim 2, wherein the demodulator is a voltage demodulator.

5. The contactless IC device of claim 2, wherein the demodulator is a current demodulator.

6. The contactless IC device as in claim 1, further comprising a demodulator circuit configured to receive the regulated carrier wave and demodulate the carrier wave to extract the digital data.

7. The contactless IC device as in claim 1, further comprising:
a coil antenna configured to receive electromagnetic wave energy, that is transmitted from an external device; and
a rectifier configured to rectify an output carrier wave from said received electromagnetic wave energy to generate a power supply voltage.

8. The contactless IC device as in claim 1, further comprising a digital signal processing unit configured to signal process the digital data.

9. The contactless IC device as in claim 8, wherein the digital signal processing unit is a CPU having a memory.

10. The contactless IC device of claim 1, wherein the predetermined voltage does not depend on the modulation index of the ASK modulated carrier wave.

11. The contactless IC device of claim 1, wherein the rectifier is a full-wave rectification circuit.

12. A contactless IC device comprising:
a detection circuit configured to detect that a carrier wave has been amplitude shift-keying (ASK) modulated with digital data; and
a shunt circuit configured to receive and regulate the ASK modulated carrier wave from a first voltage to a predetermined voltage, the first voltage and the predetermined voltage not being equal,
wherein the detection circuit is configured to detect ASK modulation at any point along a falling slope of the ASK modulated carrier wave, and in response to the detection, the shunt circuit regulates the ASK modulation from the first voltage to the predetermined voltage.

13. The contactless IC device as in claim 12, wherein the detection circuit is configured to detect an end of ASK modulation at any point along a rising edge of the ASK modulated carrier wave, and upon detecting an end, the shunt circuit regulates actively back from the predetermined voltage to the first voltage.

14. A contactless IC device comprising:
a coil antenna configured to receive electromagnetic wave energy that is transmitted from an external device;
a rectifier configured to rectify an output carrier wave from said received electromagnetic wave energy to generate a carrier wave that has been amplitude shift keying (ASK) modulated with digital data;
a detection circuit configured to detect ASK modulation at any point along a falling slope of the ASK modulated carrier wave;
a shunt circuit configured to receive the detected carrier wave from the detection circuit and to regulate the detected carrier wave to a predetermined voltage independent of a modulation index of the carrier wave;
a demodulator circuit configured to receive the regulated carrier wave, and to demodulate the carrier wave to extract the digital data; and
a digital signal processing unit configured to signal process the extracted digital data.

15. A method of actively regulating the modulation index of an amplitude-shift keying (ASK) modulated carrier wave in contactless IC devices comprising:
receiving ASK modulated carrier wave that is transmitted from an external device;
rectifying the received carrier wave to generate a power supply voltage;
detecting that the carrier wave has been ASK modulated with digital data at an input of the contactless IC device; and
regulating the detected carrier wave to a predetermined voltage,
wherein the regulating step comprises regulating the ASK modulated carrier wave between at least two stable voltage values.

16. The method of claim 15, wherein the detecting step includes detecting rising and falling edges of the ASK modulated carrier wave.

17. The method of claim 15, further comprising preventing a power supply voltage from increasing above a breakdown voltage.

18. The method of claim 15, further comprising demodulating the carrier wave to extract the digital data.

19. The method of claim 18, further comprising signal processing the extracted digital data.

20. The method of claim 15, wherein the regulating step occurs in response to the detecting step detecting amplitude shift-keying (ASK) modulation.

21. A method of actively regulating the modulation index of an amplitude-shift keying (ASK) modulated carrier wave in contactless IC devices comprising:
receiving an ASK modulated carrier wave that is transmitted from an external device;
rectifying the received carrier wave to generate a power supply voltage;
detecting that the carrier wave has been ASK modulated with digital data at an input of the contactless IC device; and
regulating the detected carrier wave to a predetermined voltage,
wherein the detection step comprises detecting a first point of ASK modulation on a falling slope of the ASK modulated carrier wave and detecting a second point of ASK modulation on a rising edge of the ASK modulated carrier wave.

* * * * *